(12) United States Patent
Schmidt

(10) Patent No.: US 8,741,368 B2
(45) Date of Patent: Jun. 3, 2014

(54) METHOD AND APPARATUS FOR DEEP-FRYING FOODS

(75) Inventor: Siegfried Schmidt, Verden/Aller (DE)

(73) Assignee: Mars, Inc., McLean, VA (US)

( * ) Notice: Subject to any disclaimer, the term of this patent is extended or adjusted under 35 U.S.C. 154(b) by 239 days.

(21) Appl. No.: 13/257,538

(22) PCT Filed: Mar. 22, 2010

(86) PCT No.: PCT/EP2010/001778
§ 371 (c)(1), (2), (4) Date: Dec. 27, 2011

(87) PCT Pub. No.: WO2010/108641
PCT Pub. Date: Sep. 30, 2010

(65) Prior Publication Data
US 2012/0093991 A1    Apr. 19, 2012

(30) Foreign Application Priority Data
Mar. 25, 2009 (DE) .......... 10 2009 014 737

(51) Int. Cl.
*A23L 1/217* (2006.01)

(52) U.S. Cl.
USPC .......... 426/438; 426/510; 426/511; 426/520; 426/523; 99/334; 99/403

(58) Field of Classification Search
USPC ............. 426/438, 520, 510, 511; 99/334, 403
See application file for complete search history.

(56) References Cited

U.S. PATENT DOCUMENTS

| | | | | |
|---|---|---|---|---|
| 1,405,821 A * | 2/1922 | Ehrhart | ......................... | 165/293 |
| 3,063,846 A | 11/1962 | Polin | | |
| 4,635,380 A * | 1/1987 | Anderson | ....................... | 34/468 |
| 5,171,600 A * | 12/1992 | Young et al. | .................. | 426/550 |
| 5,415,765 A * | 5/1995 | Banham et al. | ................. | 210/142 |
| 5,520,944 A | 5/1996 | Richardson et al. | | |
| 5,802,961 A | 9/1998 | Hay et al. | | |
| 5,918,805 A * | 7/1999 | Guyer | ........................... | 237/8 A |
| 6,634,939 B2 * | 10/2003 | Johnson | ........................ | 454/238 |
| 2006/0088633 A1 * | 4/2006 | Barber et al. | ................. | 426/465 |
| 2010/0112177 A1 * | 5/2010 | Bourg et al. | .................. | 426/560 |

FOREIGN PATENT DOCUMENTS

| | | | | |
|---|---|---|---|---|
| DE | 2724280 A1 | 2/1997 | | |
| DE | 19528985 A1 | 2/1997 | | |
| DE | 19528986 A1 | 2/1997 | | |
| EP | 1179416 | * 8/2006 | ............... | A23L 1/01 |
| GB | 587690 A | 5/1947 | | |
| GB | 1523700 A | 9/1978 | | |
| NL | 8001007 A | 9/1981 | | |

* cited by examiner

*Primary Examiner* — Drew Becker
*Assistant Examiner* — Preston Smith
(74) *Attorney, Agent, or Firm* — Fulbright & Jaworski LLP

(57) ABSTRACT

A method for deep-frying foods in which the foods to be deep-fried are delivered to hot oil or fat and transported out of the hot oil after a predetermined residence time, wherein a steam zone with superheated steam is generated above a free surface of the oil, which shields the oil from the ambient air, and from which a flow of steam corresponding to an amount of water evaporating from the deep-fried foods is withdrawn.

21 Claims, 1 Drawing Sheet

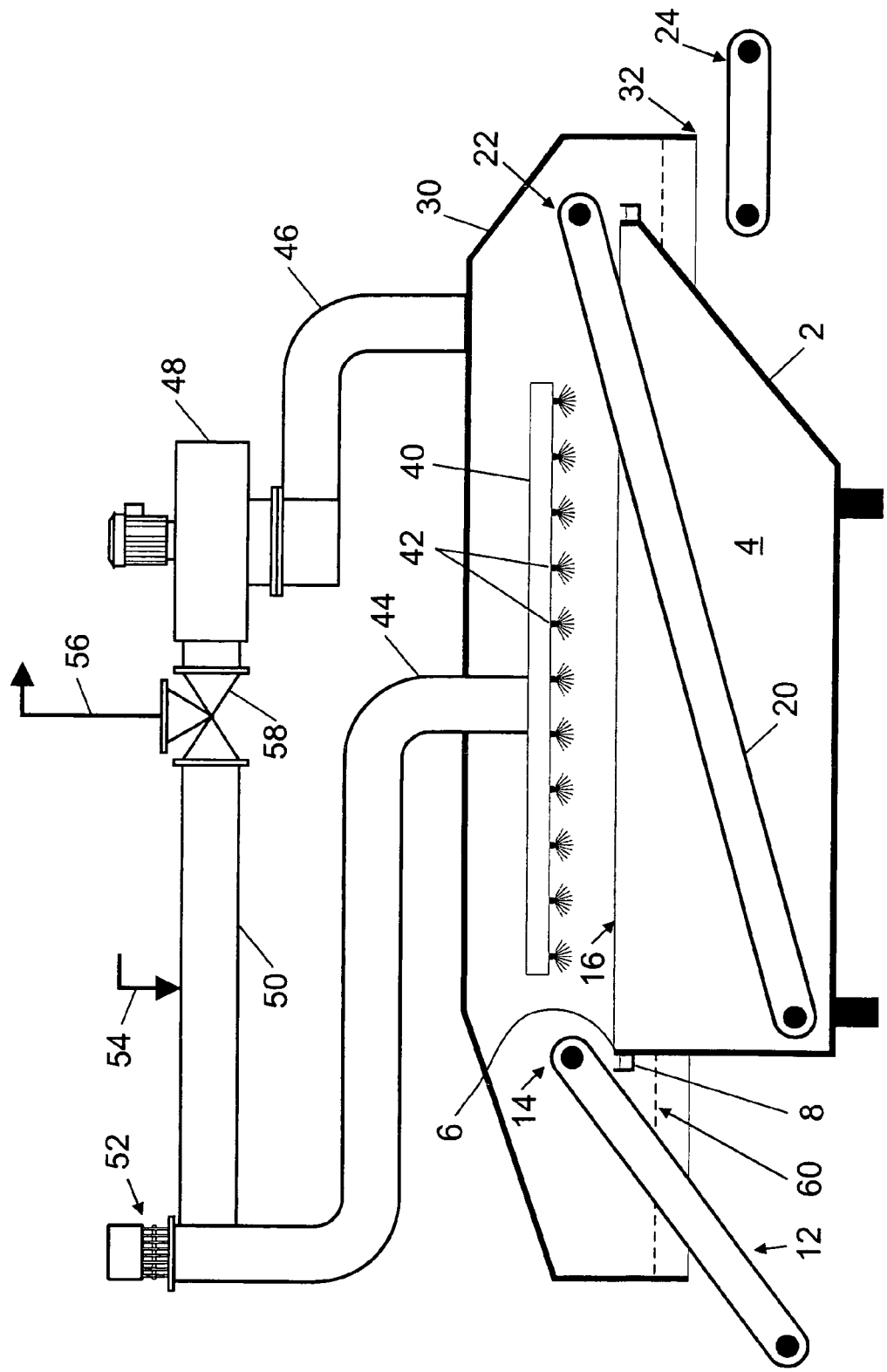

METHOD AND APPARATUS FOR DEEP-FRYING FOODS

CROSS-REFERENCE TO RELATED APPLICATIONS

This application is a national stage application of PCT/EP2010/001778 filed Mar. 22, 2010 claiming priority to Application DE 102009014737.3 filed on Mar. 25, 2009.

TECHNICAL FIELD

The invention relates to a method for deep-frying foods in which the foods to be deep-fried are delivered to hot oil or fat and transported out of the hot oil after a predetermined residence time. In addition, the invention relates to an apparatus which is suitable in particular for carrying out the of the invention, with a container for the oil, a delivery means for delivering foods into the oil and a conveying means for transporting deep-fried foods out of the oil.

BACKGROUND OF THE INVENTION

In known methods and apparatuses of the above-mentioned kind, there is a disadvantage in that the water contained in the foods, part of which is replaced by oil or fat during the deep-frying process, evaporates during residence in the hot oil and rises to the surface of the oil in the form of bubbles of steam, where the steam and entrained droplets of oil mix with the air above and have to be delivered in this condition to recycling or at least odour-neutral disposal.

Recycling or disposing of a mixture of air, water vapour, droplets of oil and aromatic or odorous substances is difficult, however, since condensation is hardly possible, because of the air content. It is also hardly possible to recover the thermal energy contained in the steam produced, because of the way it is mixed with air.

The problem of the invention consists in improving a method or apparatus of the generic kind in such a way that the above-mentioned disadvantages are substantially overcome.

BRIEF SUMMARY OF THE INVENTION

This object is achieved in accordance with the invention in a method of the generic kind in that a steam zone with superheated steam is generated above a free surface of the oil, which shields the oil from the ambient air, and from which a flow of steam corresponding to an amount of water evaporating from the deep-fried foods is withdrawn. If just as much steam is withdrawn as is produced by the deep-frying, the amount of steam or the steam volume in the steam zone remains unchanged, so that a boundary layer between the steam zone and the ambient air remains substantially immobile or within a specific region. This ensures that virtually no ambient air penetrates the steam zone and that the free surface of the hot oil does not come into contact with ambient air.

It is preferably proposed that the foods delivered enter the superheated steam before reaching the oil. It may also be provided that the foods which are transported out of the oil first enter the superheated steam before being conveyed away.

The steam atmosphere present in the steam zone is preferably circulated, in the course of which the steam is extracted from the steam zone, optionally passed through a heat exchanger and returned to the steam zone by a fan.

It is convenient for the steam to be blown onto or across the free surface of the oil.

It is convenient for a volume of steam present or circulating in the steam zone to be kept constant. That is the case if an amount of steam corresponding to the amount of steam released by the deep-frying is withdrawn, which can be partially or completely condensed.

The steam zone over the oil can be kept to an oxygen content of less than 10% by volume, 5% by volume, 3% by volume, 2% by volume or 1% by volume.

It is convenient for the flow of steam to be partially or completely condensed and for the energy and/or material to be recovered, especially in order to heat the oil.

The invention conveniently proposes that the superheated steam is blown vertically onto the free surface of the oil by means of a flow component, vertically from above for example.

In terms of the apparatus, the problem of the invention is solved in an apparatus of the generic kind by having a means for generating a steam zone with superheated steam disposed above a free surface of the oil, which shields the oil from the ambient air, with a controlled withdrawal apparatus for withdrawing a flow of steam from the steam zone corresponding to an amount of water evaporating from the deep-fried food.

It may be provided that the container has a rim running over the entire circumference of the container at a uniform height, with an overflow channel disposed outside the rim.

A steam cone may be disposed above the container, which overlaps the container on all sides and which has a peripheral, drawn-down rim running outside the rim of the container and lower down than the latter.

A steam manifold may be disposed within the steam cone, which has a number of steam nozzles pointing down vertically or obliquely and is coupled to a steam circulation line.

A fan is conveniently located between the steam circulation line and the steam manifold and outside the steam cone, which can be controlled by means of temperature, steam-content or oxygen-content sensors in the region of the steam zone.

In addition, it can be provided that there is a heat exchanger disposed in the course of the steam circulation line. Furthermore, a branch conduit may be disposed in the course of the steam circulation line for diverting out the flow of steam, which constitutes part of the circulated steam, in which a further fan may be disposed, which can be controlled by means of temperature, steam-content or oxygen-content sensors in the region of the steam zone, and also optionally a condenser.

It can be provided that the branch conduit is coupled to the steam circulation line via a three-way valve.

The invention further proposes that steam lines connected to the steam cone, especially the steam circulation line, are arranged with a slope down towards the container in order to facilitate recovery of separated oil.

BRIEF DESCRIPTION OF THE DRAWINGS

The invention will now be explained in greater detail by describing a worked embodiment, reference being made to a drawing, in which the only:

FIG. 1 shows a worked embodiment of an apparatus in accordance with the invention in a schematic side view.

DETAILED DESCRIPTION OF THE INVENTION

A tub-like container 2 for oil or fat 4 has a peripheral, horizontal rim 6, around which is disposed an overflow channel 8 below and spaced apart from the rim 6. In operation, the liquid, hot oil or fat reaches up to the height of the rim 6, so that, as products to be deep-fried are added, a corresponding overflowing stream of oil is established, running from the container over the rim and into the overflow channel 8.

A delivery means 12 is arranged such that an upper delivery end 14 is located above a free surface 16 of the oil 4 and products delivered fall into the oil 4 under the force of gravity.

A conveying means 20 extends in a sloping arrangement partially beneath the free surface 16 of the oil, and partially above it, as far as a delivery end 22, from which products transported out drop outside the rim 6 onto a conveyor belt 24, which transports the products away for further processing, packaging etc.

Above the container 2 and spaced apart from it, there is a steam cone 30, which overlaps the container 2 and is provided with a peripheral rim 32 running outside and beneath the rim 6 of the container 2. The steam cone 30 thus overlaps and encloses a steam zone above the free surface 16 of the oil from above and the side, with a gap between the steam cone and the container remaining only in the region of the rim 6.

The rim 32 of the steam cone may run beneath the free surface of the oil.

In the region of the delivery means 12 and the conveying means 20, the rim 32 of the steam cone 30 is spaced apart from the rim 6 of the container 2 so that there is sufficient room for the various pieces of equipment.

Inside the steam cone 30 and spaced apart from the top of the free surface 16 of the oil there is a steam manifold 40, which consists, in the example illustrated, of a number of steam nozzles 42 pointing vertically downwards in the direction of the free surface 16 of the oil. The steam manifold 40 is connected to a steam line 44, which passes in a steam-tight manner through the steam cone 30.

At a distance from the steam manifold 40, a steam circulation line 46 is connected, with which steam can be extracted from the interior of the steam cone 30. Connected to the steam extraction line 46 is a fan 48, which is connected on the exit side via a further steam line 50 to a heat exchanger 52, which for its part connects with the steam line 44 opening into the steam cone 30.

A steam injection line 54 can be connected in the area of the steam line 50 between the fan and the heat exchanger or elsewhere, in order to be able to deliver steam when starting up the deep-frying process, and a branch conduit 56, with which, via a three-way valve 58, a flow of steam as part of the circulated steam can be diverted and, for example, condensed or its energy recovered, and any oil contained can be separated and recycled. It is also possible for any aromatic or odorous substances contained in the steam to be extracted. Arranged in the course of the branch conduit 56, there is a controlled fan (not shown), the control of which receives data from a temperature, steam-content or oxygen sensor and/or some other sensor, which may be disposed in the steam zone or in the steam circulation line, in order to detect the amount of steam in the apparatus, i.e. whether any surplus steam is about to escape downwards or, conversely, air is about to penetrate from below. Depending on the position of the three-way valve 58, all the lines 46, 50 and 56 are connected together, so that a flow of steam can be diverted out of the circulating steam, or only lines 46, 50, so that no partial stream can be removed, or alternatively only lines 56, 50 or 46, 56, so that a branch stream can be removed while there is no circulation of the steam through the steam cone.

In operation, there is hot oil or fat in the container 2, at 145° C., for example. The free surface 16 of the oil is preferably located at the height of the rim 6 of the container 2. It is advantageous for the free surface 16 to be located slightly higher than the rim 6, so that a minor overflow stream results in the overflow channel 8. This can either be the consequence of the delivery of products to be deep-fried, or the oil is circulated by a circulation pump between the overflow channel 8 and the space enclosed by the rim 6. This situation is advantageous in that superheated steam supplied from above can spread out unhindered over the entire free surface 16 of the oil, without the latter's being limited laterally by a rim projecting up higher, which might possibly encourage the formation of regions containing air.

In order to start up the apparatus, superheated steam is delivered by the steam injection line 54 if necessary until the entire space beneath the steam cone 30 and in the steam lines is filled with superheated steam.

The fan 48 conveys the superheated steam in a circle through the heat exchanger 52, the steam manifold 40, across the surface 16 of the oil and through the space enclosed by the steam cone 30 into the steam circulation line 46.

Because of the throughput of foods to be deep-fried which contain water, steam is constantly emerging from the oil 4, the high temperature of which converts some of the water contained in the products into steam after it has passed through the free surface 16 into the steam zone enclosed by the steam cone 30. This steam is partly saturated steam, but also partly superheated steam, since the fat is at a temperature of more than 100° C. This amount of steam, which is released in addition to the amount of steam circulating inside the apparatus that becomes established in a stationary operating state, is withdrawn and can be put to further use.

If the amount of steam circulating in this way increases, a border region 60, which separates ambient air from superheated steam enclosed within the steam cone 30, moves further and further downwards towards the free rim 32 of the steam cone 30. In order to prevent steam, which is valuable in terms of its substance and the energy it contains, from escaping into the surroundings, the steam volume is reduced by removing part of the circulating flow of steam via the branch conduit 56. This can be done by means of a separate fan, as explained above, or by the fan 48, by means of an appropriate position of the three-way valve 58, if for some of the time only the path from the steam extraction line 46 into the branch conduit 56 is opened.

With the heat exchanger 52, the superheated steam can be heated or cooled as required. The energy and/or substances contained in the flow of steam removed via the branch conduit 56 can be recovered, such as by condensation in a condenser or by compression, in the course of which the temperature of the steam can be raised. Then, for example, the hot oil can be heated with the energy recovered.

The above-mentioned fan in the branch conduit 56 or the fan 48 can be controlled by detecting the position of the border region 60, such as with a temperature or oxygen sensor, so that it is ensured at all times that the border region 60 is located within a predetermined vertical region and does not shift either too far in the direction of the lower free end of the rim 32 of the steam cone 30 or too far at the level of the free surface 16. In the first case, the consequence would be a loss of steam into the surroundings, and in the second case, air could penetrate, come into contact with the free surface 16 and mix with the superheated steam, which should be avoided in accordance with the invention.

The arrangement of the invention permits the free surface 16 of the oil to remain in contact with almost or completely oxygen-free superheated steam at all times, so that oxidation of the oil is prevented or delayed considerably, and furthermore all or some of the energy and substances contained in the steam produced in the deep-frying process can be used and recycled with no difficulty. The oxygen content in the steam zone is preferably less than 10% or less than 3%, which is achieved by designing the steam cone appropriately and controlling the flow of steam withdrawn.

LIST OF REFERENCE NUMERALS

2 Container
4 Oil
6 Rim
8 Overflow channel
12 Delivery means
14 Delivery end
16 Free surface
20 Conveying means
22 Delivery end
24 Conveyor belt
30 Steam cone
32 Rim
40 Steam manifold
42 Steam nozzle
44 Steam line
46 Steam extraction line
48 Fan
50 Steam line
52 Heat exchanger
54 Steam injection line
56 Branch conduit
58 Three-way valve
60 Border region

What is claimed is:

1. A method for deep-frying foods containing water comprising the steps of:
    delivering foods containing water to be deep-fried to a container of oil or fat having a temperature of more than 100° C.;
    transporting the foods out of the container of oil after a predetermined residence time;
    generating a steam zone with superheated steam above a free surface of the oil in the container, which shields the oil from the ambient air;
    wherein a flow of steam corresponding to an amount of water evaporating from the deep-fried foods is withdrawn from the steam zone and a boundary layer between the steam zone and the ambient air is maintained within a specific vertical region thereby preventing the ambient air from penetrating the steam zone and from coming into contact with the free surface of the oil in the container.

2. The method as claimed in claim 1, wherein the superheated steam is circulated, in the course of which the steam is extracted from the steam zone and returned to the steam zone by a fan.

3. The method as claimed claim 1, wherein the steam is blown onto or across the free surface.

4. The method as claimed in claim 1, wherein a volume of steam present or circulating in the steam zone is kept constant.

5. The method as claimed in claim 1, wherein an oxygen content in the steam zone over the oil is kept to less than 10% by volume.

6. The method as claimed in claim 1, wherein the flow of steam is at least partially condensed and the energy and/or material is recovered in order to heat the oil.

7. The method as claimed in claim 1, wherein an oxygen content in the steam zone over the oil is kept to less than 5% by volume.

8. The method as claimed in claim 1, wherein an oxygen content in the steam zone over the oil is kept to less than 3% by volume.

9. The method as claimed in claim 1, wherein an oxygen content in the steam zone over the oil is kept to less than 2% by volume.

10. The method as claimed in claim 1, wherein an oxygen content in the steam zone over the oil is kept to less than 1% by volume.

11. The method as claimed in claim 1, wherein the superheated steam is circulated, in the course of which the steam is passed through a heat exchanger before being returned by a fan.

12. An apparatus for deep-frying foods in oil or fat having a temperature of more than 100° C. comprising:
    a container for the oil, a delivery means for delivering foods into the oil and a conveying means for transporting deep-fried foods out of the oil;
    a steam cone overlapping the container above a free surface of the oil for generating a steam zone with superheated steam which shields the oil in the container from the ambient air;
    a steam extraction line is connected to the steam cone, wherein a fan and a branch conduit are disposed in the steam extraction line and a controlled fan is disposed in the branch conduit;
    a control device of the fan for receiving data from a sensor for withdrawing a flow of steam from the steam zone corresponding to an amount of water evaporating from the deep-fried foods and maintaining a boundary layer between the steam zone and the ambient air within a specific region, thereby preventing the ambient air from penetrating the steam zone and from coming into contact with the free surface of the oil in the container.

13. The apparatus as claimed in claim 12, wherein the container has a rim running around the entire circumference of the container at a uniform height, with an overflow channel disposed outside the rim.

14. The apparatus as claimed in claim 12, wherein the steam cone is disposed above the container, the steam cone having a peripheral, drawn-down rim running outside the rim of the container and lower down than the outside rim of the container.

15. The apparatus of claim 12, wherein the sensor is selected from a group consisting of a temperature sensor, a steam-content sensor, an oxygen sensor, and another sensor.

16. The apparatus as claimed in claim 14, wherein a steam manifold is disposed within the steam cone, the manifold having a number of steam nozzles pointing down vertically or obliquely and is coupled to a steam extraction line.

17. The apparatus as claimed in claim 16, wherein a controlled fan is disposed between the steam extraction line and the steam manifold outside the steam cone.

18. The apparatus as claimed in claim 16, wherein a heat exchanger is disposed in the course of the steam extraction line.

19. The apparatus as claimed in claim 16, wherein the branch conduit is disposed in the course of the steam extraction line, in which a further controlled fan and a condenser may be disposed.

20. The apparatus as claimed in claim 19, wherein the branch conduit is coupled to the steam extraction line by means of a three-way valve.

21. The apparatus as claimed in claim 16, wherein the steam extraction line is arranged with a slope down towards the container.

* * * * *